United States Patent
Berg et al.

(10) Patent No.: US 9,571,195 B2
(45) Date of Patent: Feb. 14, 2017

(54) OPTICAL RELAY CABLE

(71) Applicant: EchoStar Technologies L.L.C., Englewood, CO (US)

(72) Inventors: Eric Berg, Littleton, CO (US); Svitlana Trygubova, Lakewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/983,905

(22) Filed: Dec. 30, 2015

(65) Prior Publication Data

US 2016/0112131 A1   Apr. 21, 2016

Related U.S. Application Data

(62) Division of application No. 13/359,597, filed on Jan. 27, 2012, now Pat. No. 9,252,880.

(51) Int. Cl.
 *G02B 6/26* (2006.01)
 *G02B 6/42* (2006.01)
 *H04B 10/25* (2013.01)
 *H04B 10/114* (2013.01)

(52) U.S. Cl.
 CPC ....... *H04B 10/2504* (2013.01); *H04B 10/1141* (2013.01); *H04B 10/25* (2013.01)

(58) Field of Classification Search
 CPC ..... H04B 10/2504; H04B 10/25; H04B 10/11; H04B 10/1125; H04B 10/118; H04B 10/1121; H04B 10/1141; B82Y 20/00; G02B 6/12007; G02B 6/29395; G02B 6/125; G02B 6/262
 USPC .................................. 385/39; 398/131, 200
 See application file for complete search history.

(56) References Cited

U.S. PATENT DOCUMENTS

| | | | | |
|---|---|---|---|---|
| 5,479,540 A | * | 12/1995 | Boudreau | G02B 6/4246 385/14 |
| 7,522,792 B2 | * | 4/2009 | Sugita | G02B 27/0994 385/32 |
| 9,252,880 B2 | | 2/2016 | Berg et al. | |
| 2003/0081294 A1 | | 5/2003 | Lee | |

(Continued)

OTHER PUBLICATIONS

U.S. Appl. No. 13/359,597, filed Jan. 27, 2012 Non-Final Rejection mailed Mar. 18, 2014, 13 pages.

(Continued)

*Primary Examiner* — Jerry Blevins
(74) *Attorney, Agent, or Firm* — Kilpatrick Townsend & Stockton

(57) ABSTRACT

Described herein is a system for transmitting an optical signal from a first location to a second location. The system may include first and second mounting fixtures, a reception module, an optical fiber, and a transmission module. The first fixture may define at least a first cavity and a first aperture at the bottom of the cavity. The reception module may be disposed in the cavity, and include a reflector for receiving the optical signal from a first direction through the first aperture and redirecting the optical signal in another direction. The optical fiber may be for receiving the optical signal from the reflector. The second fixture may define at least a second cavity and a second aperture on the side of the cavity. The transmission module may be disposed in the second cavity and direct the optical signal from the optical fiber through the second aperture.

14 Claims, 16 Drawing Sheets

(56) References Cited

U.S. PATENT DOCUMENTS

2007/0003288 A1\* 1/2007 Tong .................... G02B 6/0288
398/142

OTHER PUBLICATIONS

U.S. Appl. No. 13/359,597, filed Jan. 27, 2012 Final Rejection mailed Sep. 30, 2014, 13 pages.
U.S. Appl. No. 13/359,597, filed Jan. 27, 2012 Non-Final Rejection mailed Feb. 20, 2015, 16 pages.
U.S. Appl. No. 13/359,597, filed Jan. 27, 2012 Notice of Allowance mailed Sep. 21, 2015, 19 pages.

\* cited by examiner

OPTICAL RELAY CABLE

CROSS-REFERENCE TO RELATED APPLICATIONS

This application is a divisional of U.S. application Ser. No. 13/359,597, filed Jan. 27, 2012, the disclosure of which is incorporated by reference herein in its entirety.

BACKGROUND

Different electronic components, most notably of audio/visual equipment, often communicate with each other via infrared or other optical signals. While this sort of communication is often between a transmitting remote control and receiving audio/visual equipment such as set top boxes and televisions, on some occasions the need arises to transmit between devices which are more typically thought of as optical signal receiving devices (e.g., set top boxes and televisions).

In these situations, the audio/visual devices are usually located near each other and oriented facing in a similar or a same direction. Since the optical receiving/transmitting points of such devices are thus also usually oriented in a similar or a same direction (as opposed to facing each other), it may become problematic for them to receive optical signals from one another.

The prior art typically relies on environmental reflectance to deliver optical signals from one device to the other in these situations. For example, an optical signal may be transmitted from a set top box outward, reflected off furniture and/or walls, and then received by a television near the set top box that could not otherwise receive the optical signal more directly. The problem with this approach is that reliable transmission of the optical signal from one device to another may not occur in every potential environment (e.g., different homes of different set top box and television users).

BRIEF DESCRIPTION

In one embodiment, a system for transmitting an optical signal from a first location to a second location is provided. The system may include a first mounting fixture, a reception module, an optical fiber, a second mounting fixture, and a transmission module. The first mounting fixture may define at least a first cavity and a first aperture at the bottom of the first cavity. The reception module may be disposed in the first cavity, and include a reflector for receiving the optical signal from a first direction through the first aperture and redirecting the optical signal in a second direction. The optical fiber may be for receiving the optical signal from the reflector. The second mounting fixture may define at least a second cavity and a second aperture on the side of the second cavity. The transmission module may be disposed in the second cavity and direct the optical signal from the optical fiber through the second aperture in a third direction.

In another embodiment, a method for transmitting an optical signal from a first location to a second location is provided. The method may include receiving the optical signal from a first direction through a first aperture at the bottom of a cavity in a first mounting fixture. The method may also include reflecting the optical signal in a second direction through a second aperture in the first mounting fixture. The method may further include transmitting the optical signal through an optical fiber. The method may additionally include transmitting the optical signal in a third direction through a third aperture in a second mounting fixture. The method may moreover include transmitting the optical signal from the optical fiber toward a receiver.

In another embodiment, a system for transmitting an optical signal from a first location to a second location is provided. The system may include a first means, a second means, a third means, and a fourth means. The first means may be for receiving the optical signal and reflecting the optical signal. The second means may be for transmitting the reflected optical signal. The third means may be for securing the first means to a first surface. The fourth means may be for securing the second means to a second surface, where the fourth means is identical to the third means.

Figure 1:
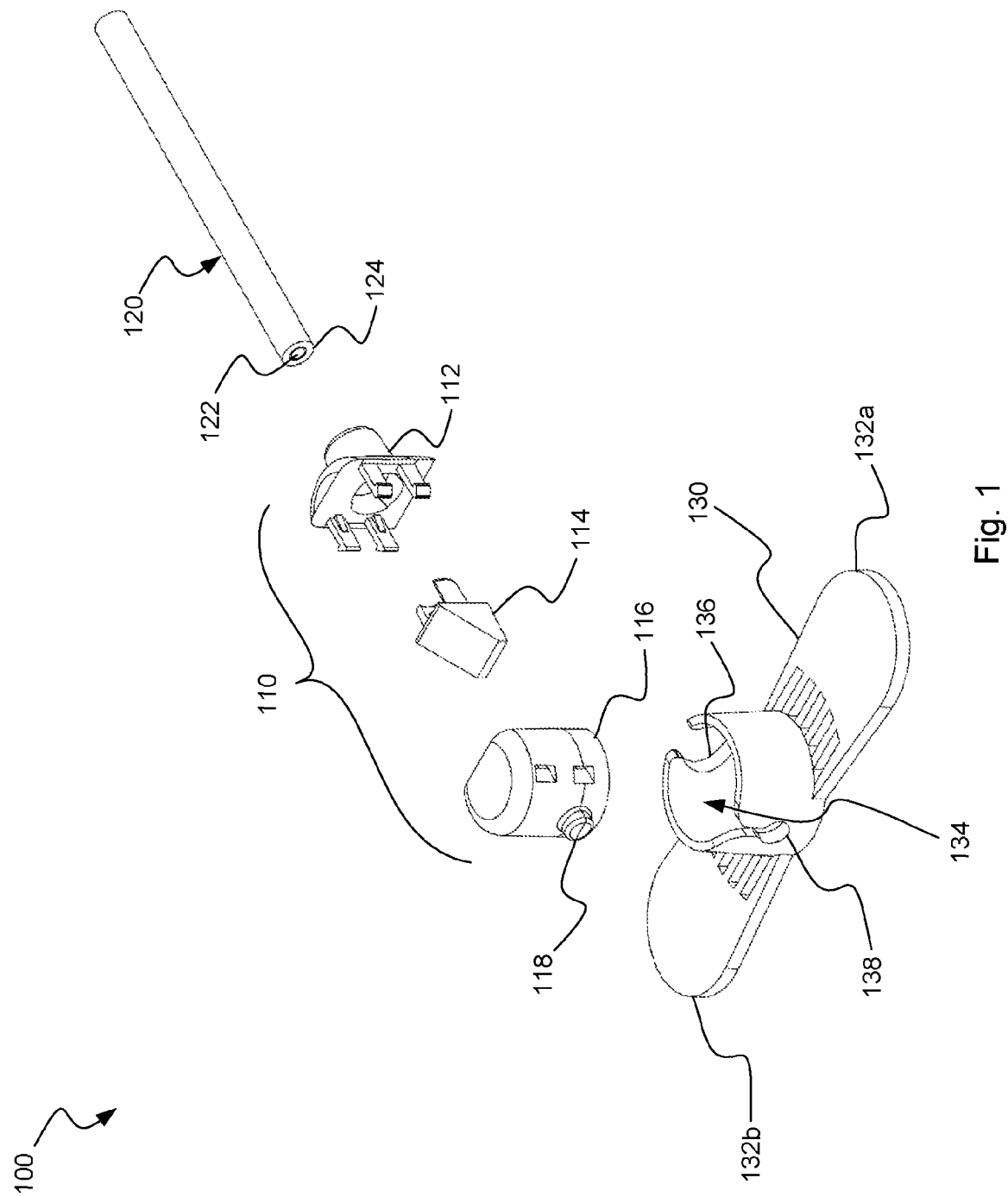
FIGS. 1-4 are axonometric views of an unassembled reception module, optical cable, and mounting fixture of one embodiment.
Figure 2:
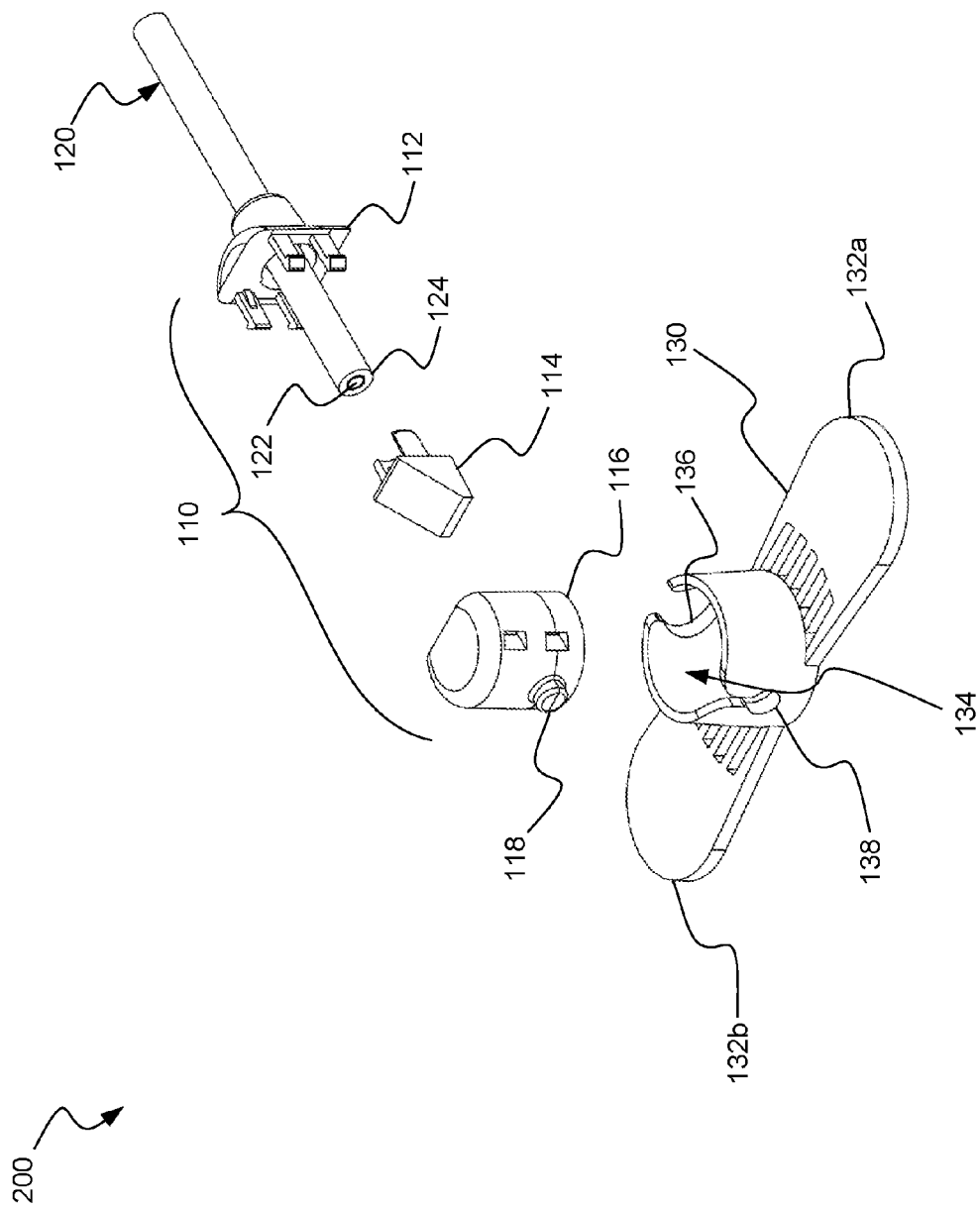
Figure 3:
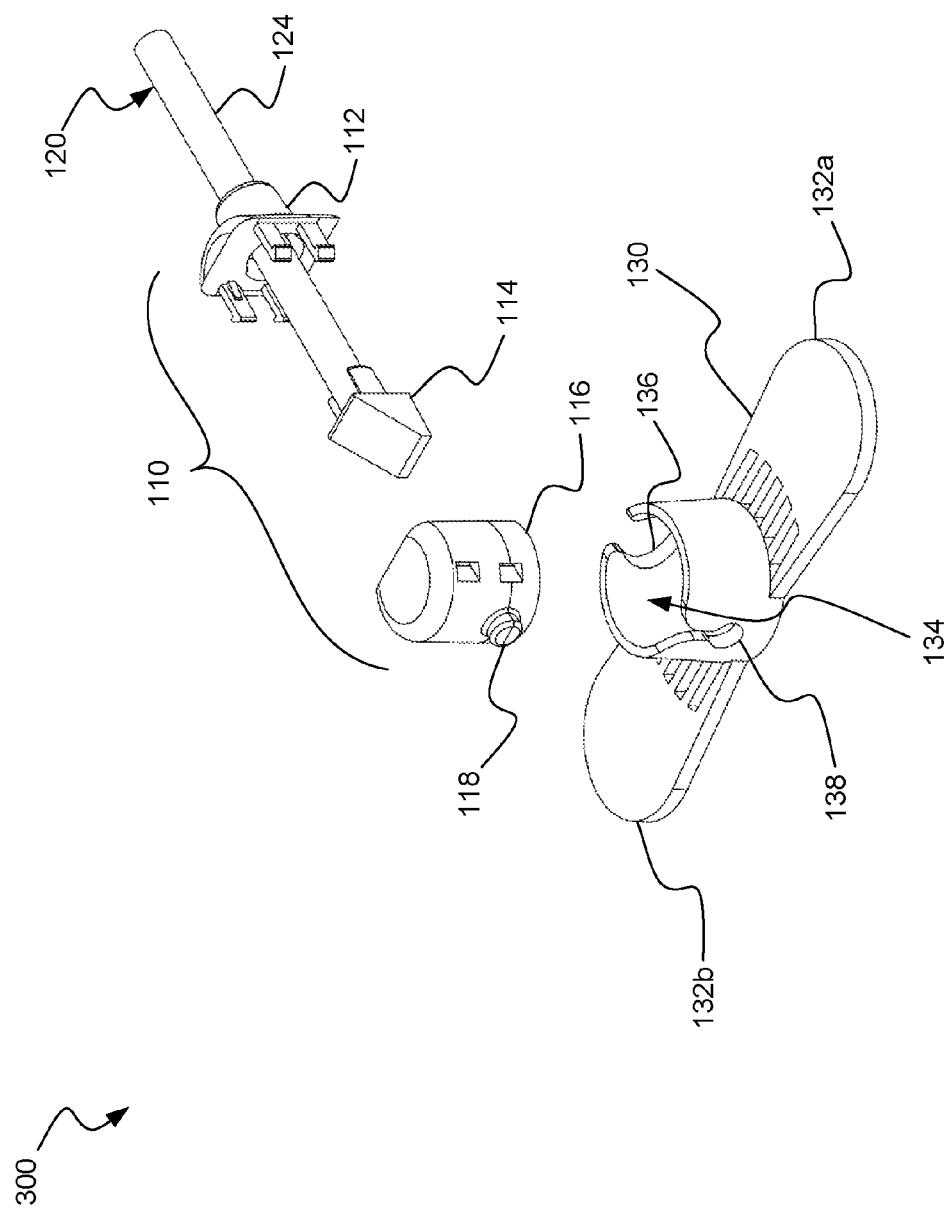
Figure 4:
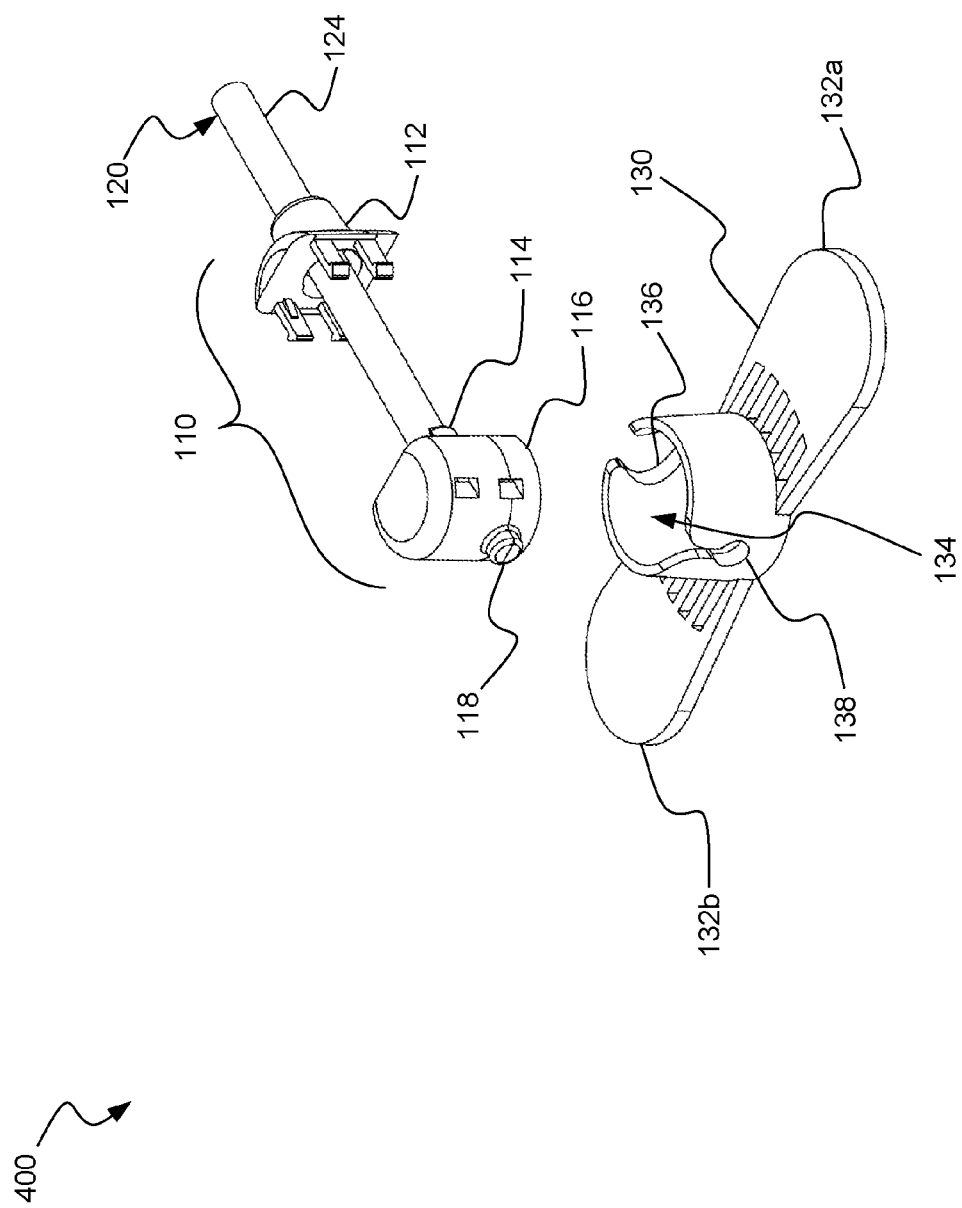
Figure 5:
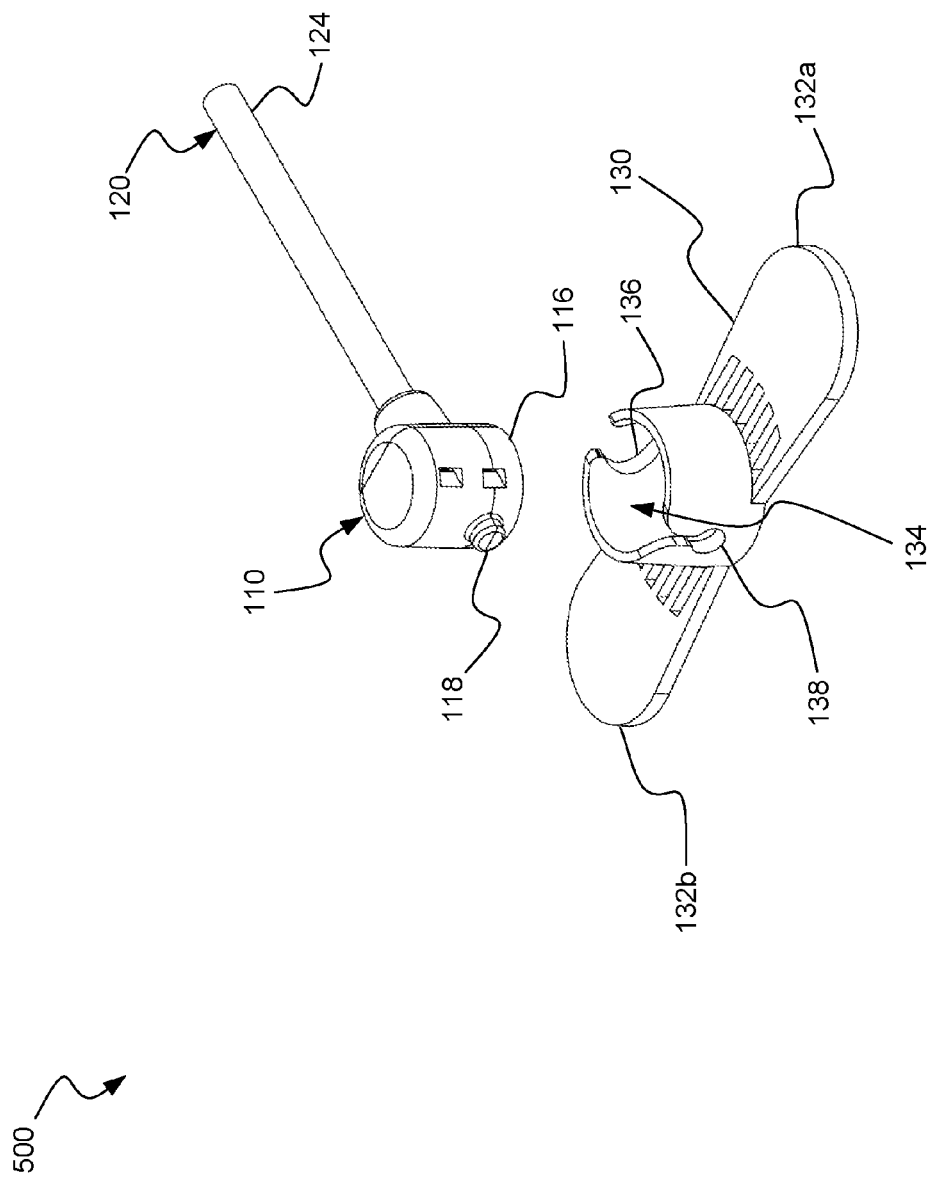
FIG. 5 is an axonometric view of an assembled reception module with optical cable and mounting fixture of one embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. One of skill in the art will understand that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, well-known structures and techniques may be shown and discussed without unnecessary detail in order to avoid obscuring the embodiments. In yet another example, any step performed by any system or method herein may or may not occur in all embodiments, or may be performed in a different order than explicitly disclosed.

Systems and methods described herein may provide, among other capabilities, the ability to reliably transmit optical signals from a set top box to a television, while leaving the optical reception of the television unobstructed so that the television may also receive optical signals from other sources such as remote controls. Additionally, systems and methods described herein may provide an advantageous physical layout which allows for the easy rearrangement of the set top box and television as needed. Furthermore, systems and methods described herein provide common components which may be used for different functions, reducing the cost and time to manufacture completed systems described herein.

The term "set top box" is used throughout this disclosure, and is intended to describe any device capable of receiving and/or sending audio and/or visual information for reproduction by audio/visual equipment. Set top boxes may include, merely by way of example, satellite television receivers and cable television receivers, including those with or without digital video recorders. A set top box need not be located on top of any other particular device.

In one embodiment, a system for transmitting an optical signal from a first location to a second location is provided. The system may include a first mounting fixture, a reception module, an optical fiber, a second mounting fixture, and a transmission module. The first mounting fixture may define at least a first cavity and a first aperture at the bottom of the first cavity. The reception module may be disposed in the first cavity, and include a reflector for receiving the optical signal from a first direction through the first aperture and redirecting the optical signal in a second direction. The optical fiber may be for receiving the optical signal from the reflector. The second mounting fixture may define at least a second cavity and a second aperture on the side of the second cavity. The transmission module may be disposed in the second cavity and direct the optical signal from the optical fiber through the second aperture in a third direction.

In some embodiments, the first mounting fixture may be identical to the second mounting fixture. As described above, and will be further discussed in reference to the figures, this may allow for lesser manufacturing costs compared to embodiments where the first and second mounting fixture are different.

In some embodiments the second mounting fixture may be configured to be mounted on a surface, possibly near an optical signal receiver. The second mounting fixture, in conjunction with the transmission module may further be configured to direct the optical signal from the optical fiber through the second aperture at a grazing angle to the surface of 45 degrees or less to impact the optical signal receiver. In these or other embodiments, the mounting fixtures may include wings extending away from the sides of the cavity to facilitate mounting to the surface. An adhesive, such as double-sides tape, may be disposed on the bottom the wings or other portions of the mounting fixtures to adhere the fixtures to the surface easily. Because the reception module and transmission module are reversibly disposed within their respective mounting fixture cavities, the mounting fixtures need not be easily removed from the surfaces to which they are mounted (i.e., set top box and television).

In some embodiments, the first mounting fixture may further define another aperture on the side of the first cavity. The reflection of the optical signal received by the reflector may be through this other aperture. In these or other embodiments, the first and/or second mounting fixture may also further define an additional aperture in which a protrusion of either the reception module or transmission module may be disposed to orient and secure such module in the mounting fixture. These protrusion-accepting apertures may be opposite any aperture through which the optical signal travels.

In another embodiment, a method for transmitting an optical signal from a first location to a second location is provided. The method may include receiving the optical signal from a first direction through a first aperture at the bottom of a cavity in a first mounting fixture. The method may also include reflecting the optical signal in a second direction through a second aperture in the first mounting fixture. The method may further include transmitting the optical signal through an optical fiber. The method may additionally include transmitting the optical signal in a third direction through a third aperture in a second mounting fixture. The method may moreover include transmitting the optical signal from the optical fiber toward a receiver.

In some embodiments, the optical signal may be originally received from an optical signal transmitter, for example a set top box or other device. The set top box or other device may be coupled directly beneath the first mounting fixture. In these and other embodiments, the receiver to which the optical signal is transmitted may be a television or other device. The television or other device may be coupled directly beneath the second mounting fixture, but the exact optical signal receiving point of the television device may be located nearby the mounting point such that the optical signal transmitted by the optical fiber properly impacts the television or other device at the optical receiver.

In another embodiment, a system for transmitting an optical signal from a first location to a second location is provided. The system may include a first means, a second means, a third means, and a fourth means.

The first means may be for receiving the optical signal and reflecting the optical signal. Merely by way of example, the first means may include a reception module as described herein, or any other equivalent means, existing now or in the future, capable of performing the same function.

The second means may be for transmitting the reflected optical signal. Merely by way of example, the second means may include an optical fiber and/or transmission module as described herein, or any other equivalent means, existing now or in the future, capable of performing the same function.

The third means may be for securing the first means to a first surface. The fourth means may also be for securing the second means to a second surface, where the fourth means is identical to the third means. Merely by way of example, the third means and fourth means may include a mounting fixture as described herein, or any other equivalent means, existing now or in the future, capable of performing the same function. Thus, both the second and fourth means may also be for directing the optical signal to a target location. The location and orientation of the fourth means, along with the construction of the second means, may determine the exact impact point of the transmitted optical signal on a nearby reception surface.

Turning now to FIG. 1, an axonometric view 100 of an unassembled reception module 110, optical cable 120, and mounting fixture 130 is shown. Unassembled reception module 110 may, in this embodiment, include three parts: back portion 112, reflector 114, and front portion 116. Optical cable 120 includes optical fiber 122 and sheathing 124. FIGS. 2-5 show axonometric views 200, 300, 400, 500 of the various stages of assembly of reception module 110.

In this embodiment, reception module 110 has three sub-parts, while in other embodiments it may have fewer or greater number of parts to accomplish the same function. Back portion 112 accepts optical cable 120, and connects via flexible teeth to front portion 116. Between rear portion 112 and front portion 116, reflector 114 is coupled with the end of optical cable 120, and may transmit signals from the bottom side of reflector 114 to optical fiber 122. The backside of reflector 114 may have a fixture with teeth that grip sheathing 124 when optical cable 120 is inserted into the fixture and the fixture is disposed within rear portion 112. A hole or aperture in the bottom of front portion 116 may allow the signal to reach reflector 114. Front portion 116 may also have a protrusion 118, the function of which will be explained below.

Mounting fixture 130 may include two wings 132 and define a cavity 134. The wings may be flexible in relation to cavity 134, possibly as shown here through the use of slots cut into wings 132 as shown, and/or because they are made from a flexible material. Mounting fixture 130 may have three apertures: a first aperture 136 on a side of cavity 134, a second aperture 138 on the opposite side of cavity 134, and a bottom aperture on the bottom of cavity 134 (not shown due to axonometric angle).

First aperture 136 may allow the optical cable 120 end of reception module 110 to be firmly seated when disposed in cavity 134. Second aperture 138 may allow protrusion 118 to also assist in keeping reception module 110 firmly seated when disposed in cavity 134. Mounting fixture 130 may be made from a relatively flexible material such as a polymer to allow reception module to enter into cavity 134 and the various apertures.

The bottom aperture of mounting fixture 130 may allow an optical signal to be received from below by the reflector in reception module 110. Thus mounting fixture 130 may be disposed over an optical transmitter such that the optical transmitter is able to send an optical signal through the bottom aperture of cavity 134, through a hole or aperture in the bottom of reception module 110, to be reflected by reflector 114, and into optical fiber 122.

Figure 6:
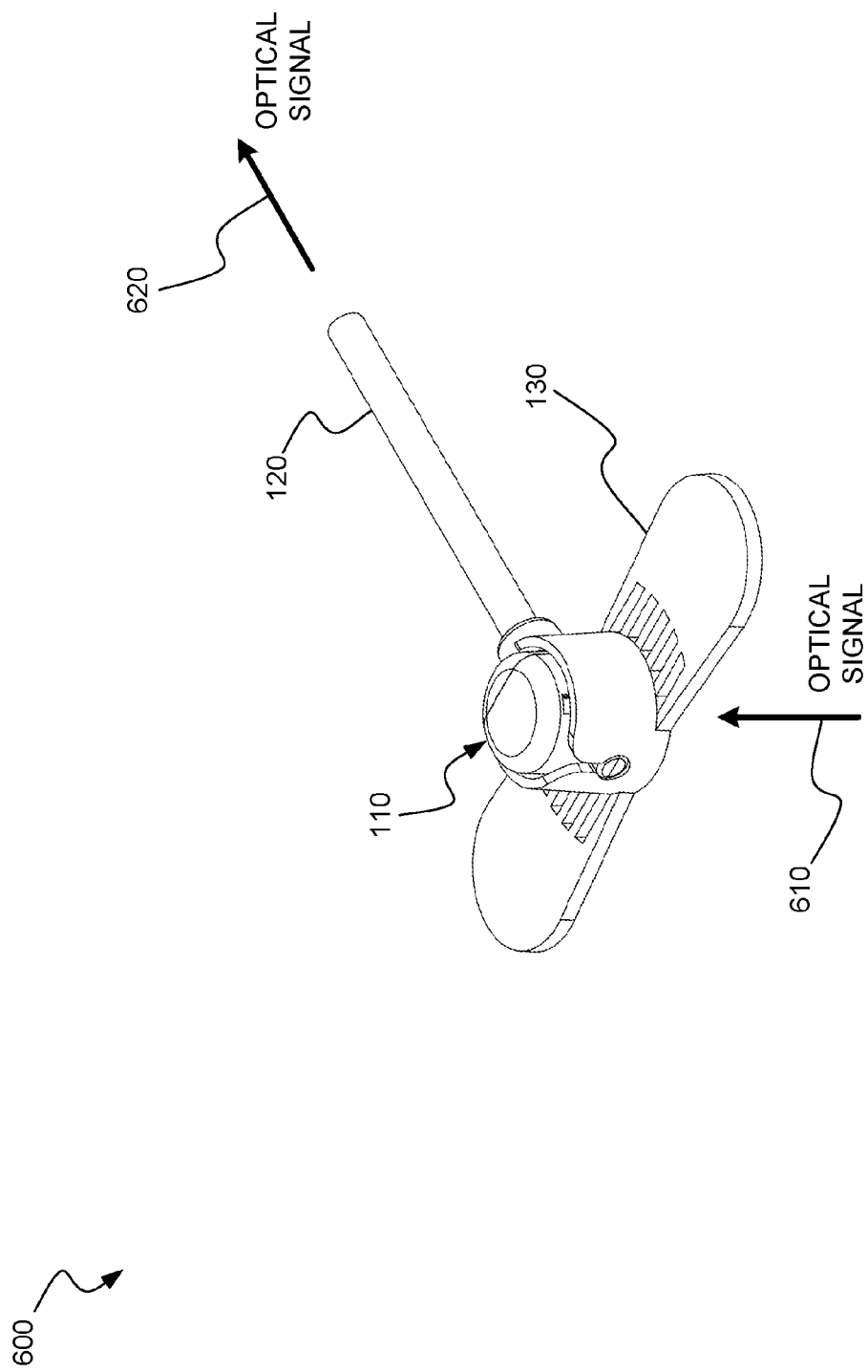
FIG. 6 is an axonometric view of an assembled reception module with optical cable disposed in a mounting fixture of one embodiment.
Figure 6A:
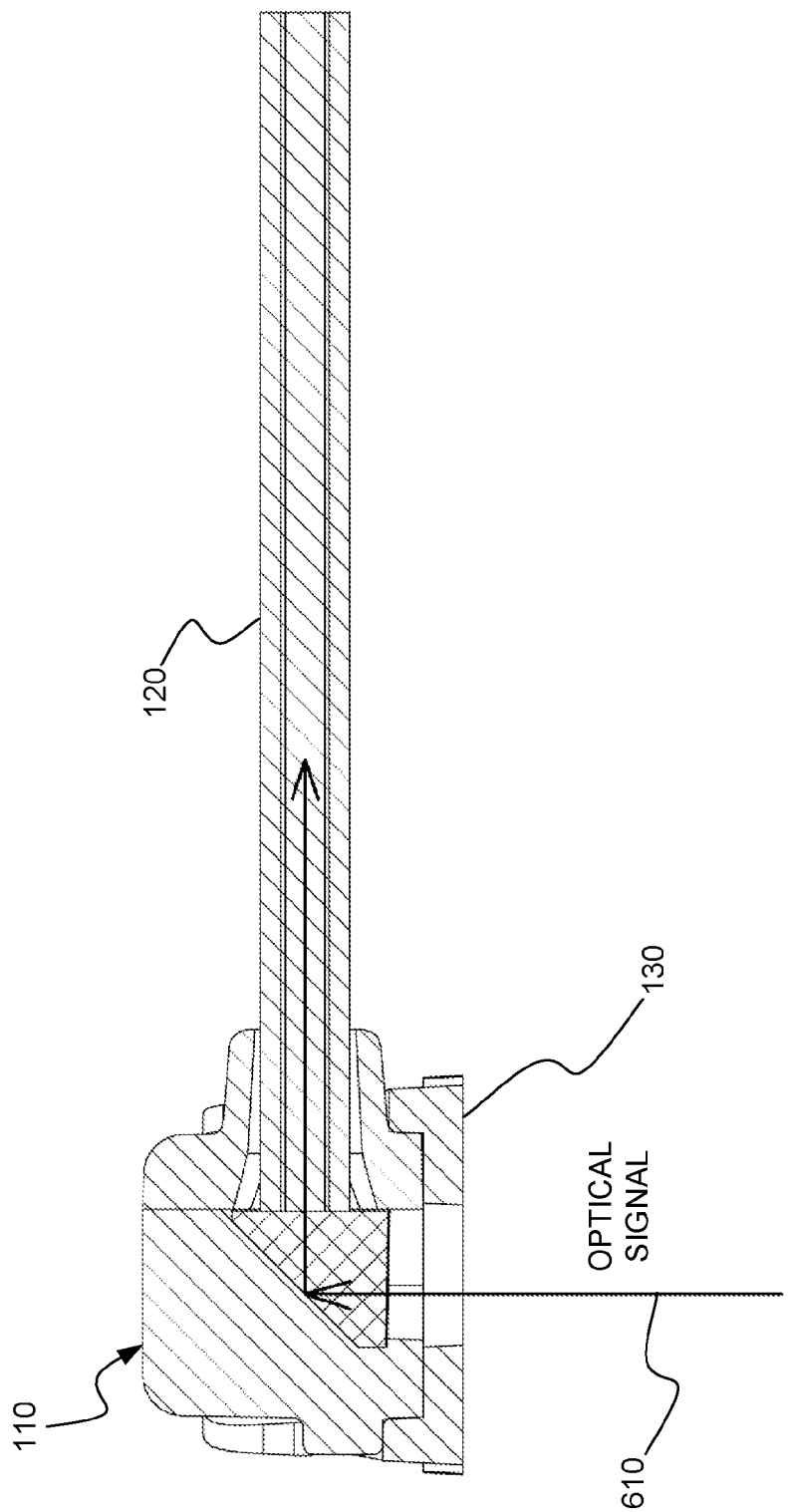
FIG. 6a is a sectional view of FIG. 6.

FIG. 6 is an axonometric view 600 of assembled reception module 110 with connected optical cable 120 disposed in mounting fixture 130. As shown from arrows 610, 620, this assembly is now capable of receiving an optical signal from beneath mounting fixture 130 in the direction of arrow 610 and retransmitting it through optical cable 120 in the direction of arrow 620. Optical cable 120 may be of any length and extend to a transmission module which will be detailed below. Thus in the above example of a set top box transmission point, mounting fixture 130 would be located over an optical transmission (e.g., infrared transmission) point on the set top box. FIG. 6a shows a sectional view of the optical signal transmission path of FIG. 6.

Figure 7:
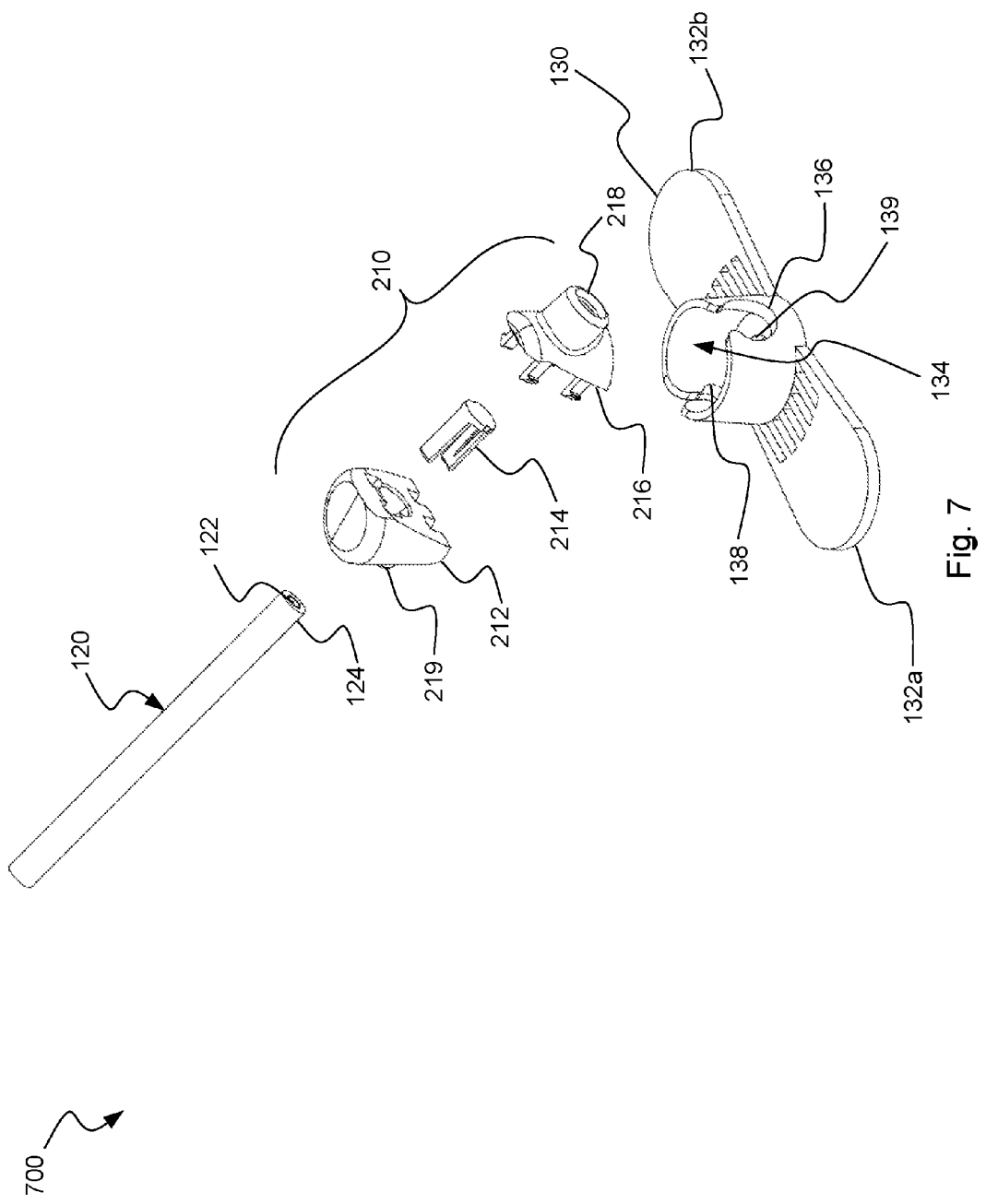
FIGS. 7-10 are axonometric views of an unassembled transmission module, optical cable, and mounting fixture of one embodiment.
Figure 8:
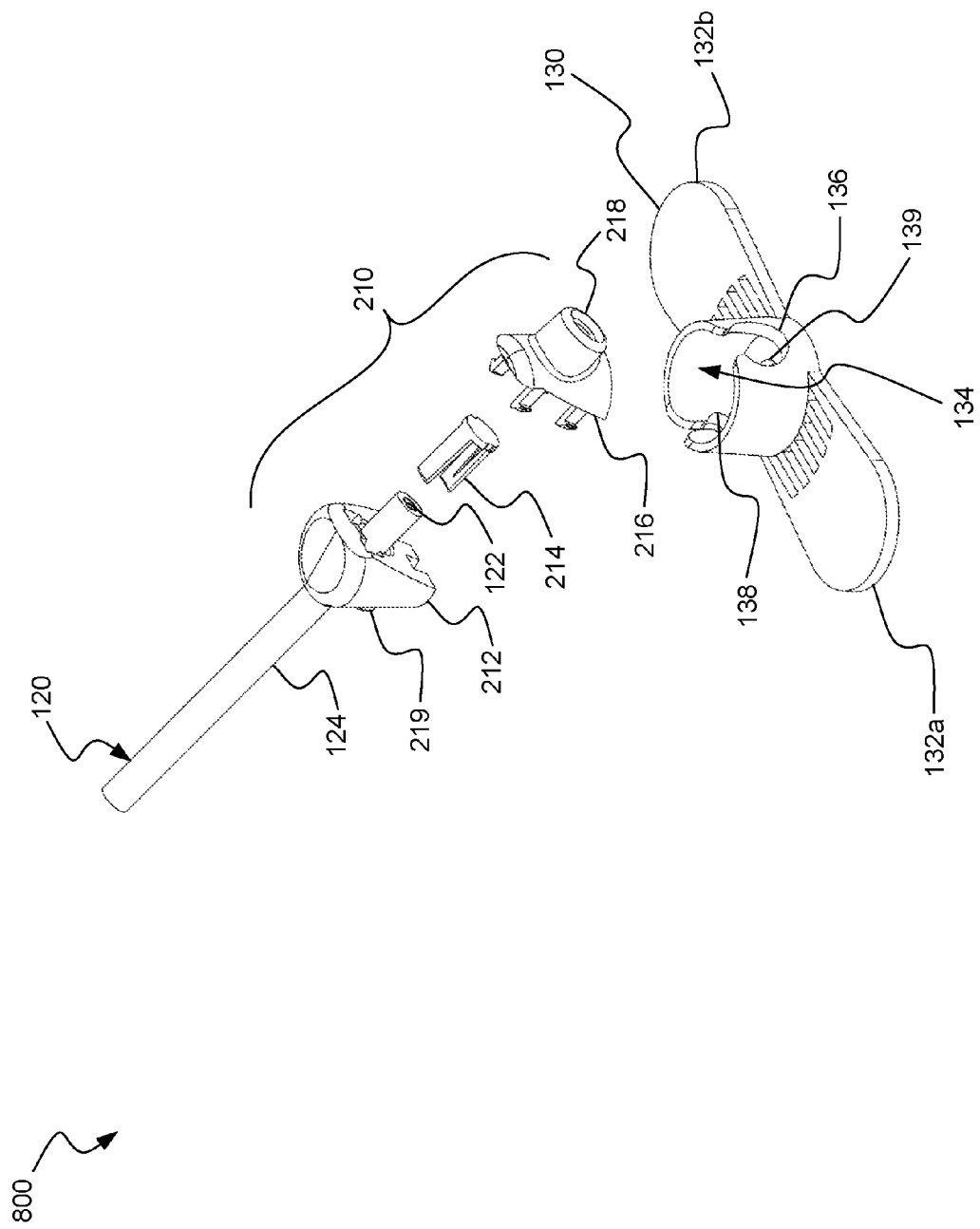
Figure 9:
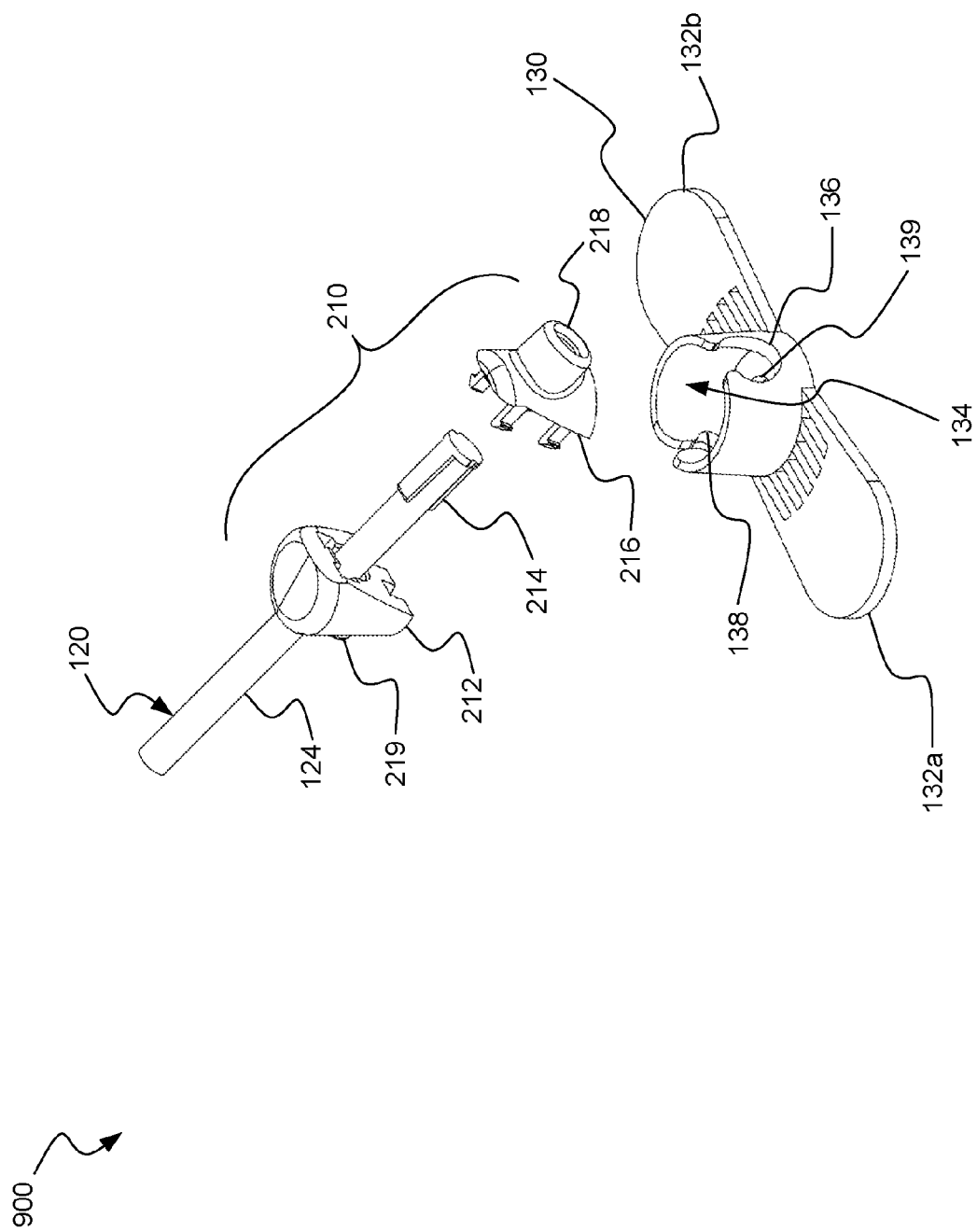
Figure 10:
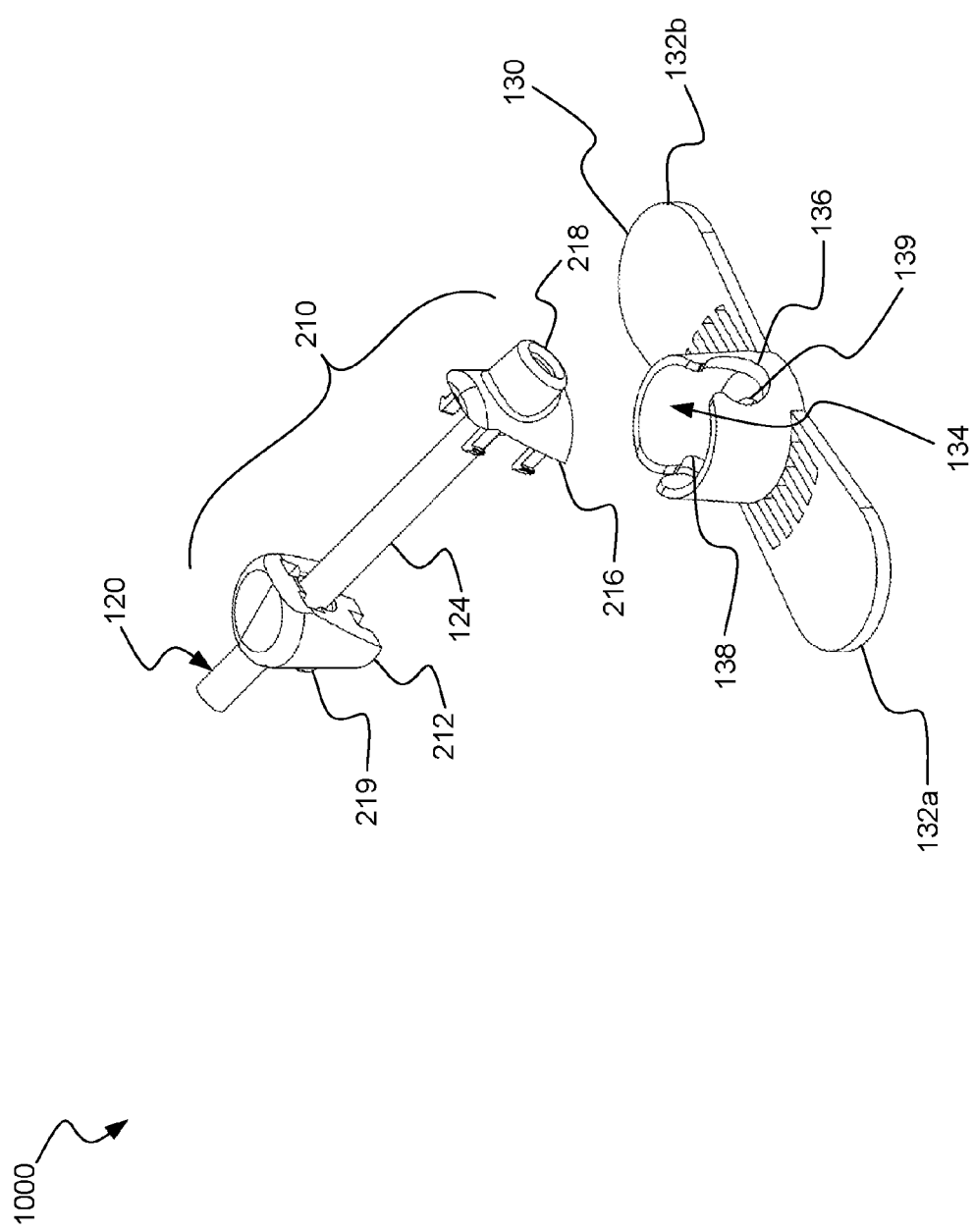
Figure 11:
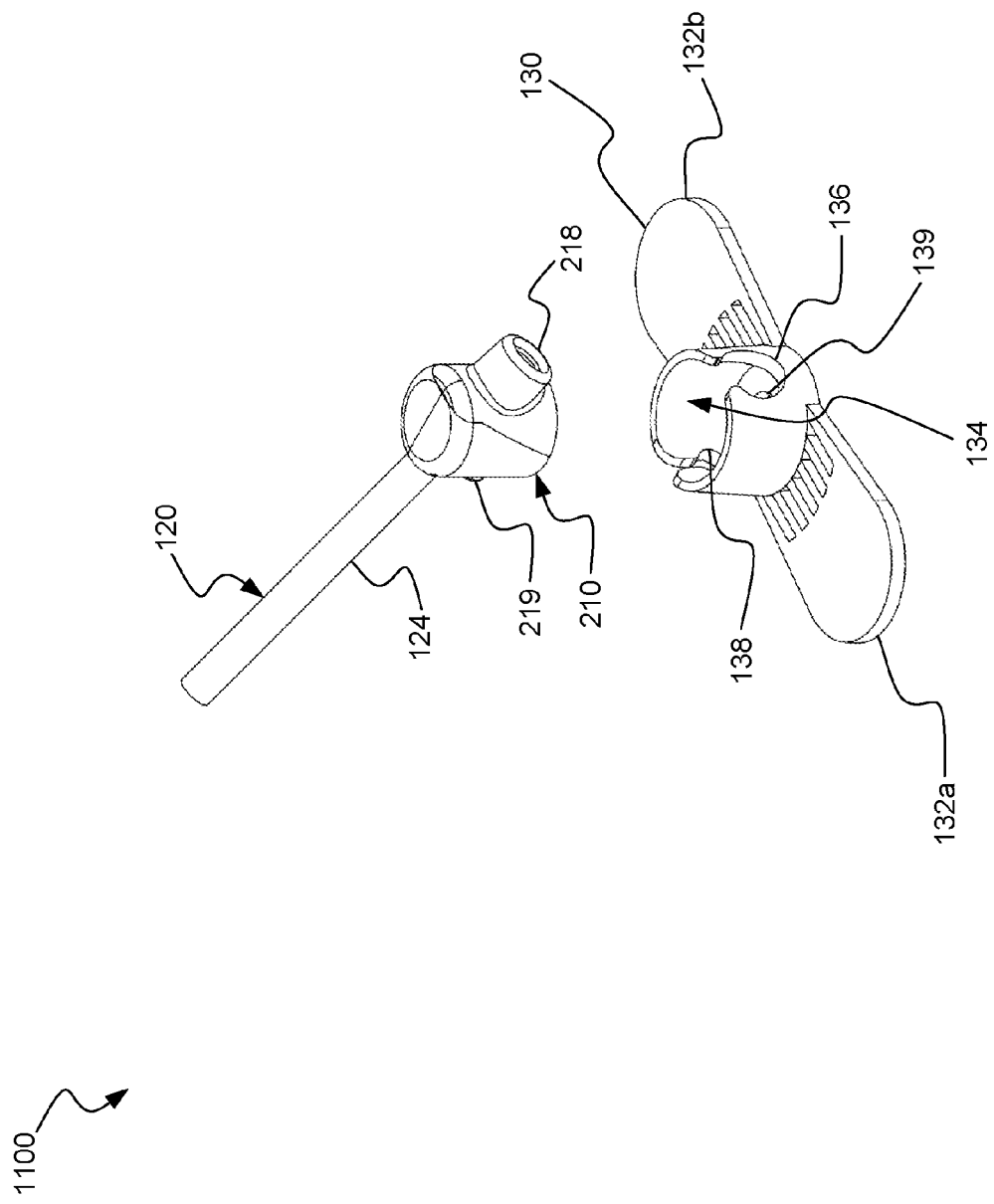
FIG. 11 is an axonometric view of an assembled transmission module with optical cable and mounting fixture of one embodiment.

FIG. 7 shows an axonometric view 700 of an unassembled transmission module 210, optical cable 120, and mounting fixture 130 is shown. Unassembled transmission module 210 may, in this embodiment, include three parts: back portion 212, optical terminator 214, and front portion 216. Optical cable 120 is the opposite end of optical cable 120 from the previous figures, and again includes optical fiber 122 and sheathing 124. FIGS. 8-11 show axonometric views 800, 900, 1000, 1100 of the various stages of assembly of transmission module 210.

In this embodiment, transmission module 210 has three sub-parts, while in other embodiments it may have fewer or greater number of parts to accomplish the same function. Back portion 212 accepts optical cable 120, and connects with flexible teeth on front portion 216. Between rear portion 212 and front portion 216, optical terminator 214 is coupled with the end of optical cable 120. Optical terminator 214 protects the terminating end of optical fiber 122. The backside of optical terminator 214 may have a fixture with teeth that grip sheathing 124 when optical cable 120 is inserted into the fixture and the fixture is disposed within rear portion 212. A hole or aperture 218 in the front face of front portion 216 may allow the signal to be transmitted from transmission module 210. Rear portion 212 may also have a protrusion 219 which will operate in a similar manner to protrusion 118 previously described.

Mounting fixture 130 as used with transmission module 210 may be identical to mounting fixture 130 used with reception module 110. As such, it may include two wings 132 and define a cavity 134. The wings may be flexible in relation to cavity 134, possibly as shown here through the use of slots cut into wings 132 as shown, and/or because they are made from a flexible material. Mounting fixture 130 may have three apertures: a first aperture 136 on a side of cavity 134, a second aperture 138 on the opposite side of cavity 134, and a bottom aperture 139 on the bottom of cavity 134.

At this transmission end of the system, first aperture 136 may allow transmission aperture 218 of transmission module 210 to assist in firmly seating transmission module 210 when disposed in cavity 134. Second aperture 138 may allow protrusion 219 to also assist in keeping transmission module 210 firmly seated when disposed in cavity 134. Mounting fixture 130 may be made from a relatively flexible material such as a polymer to allow reception module to enter into cavity 134 and the various apertures.

Figure 12:
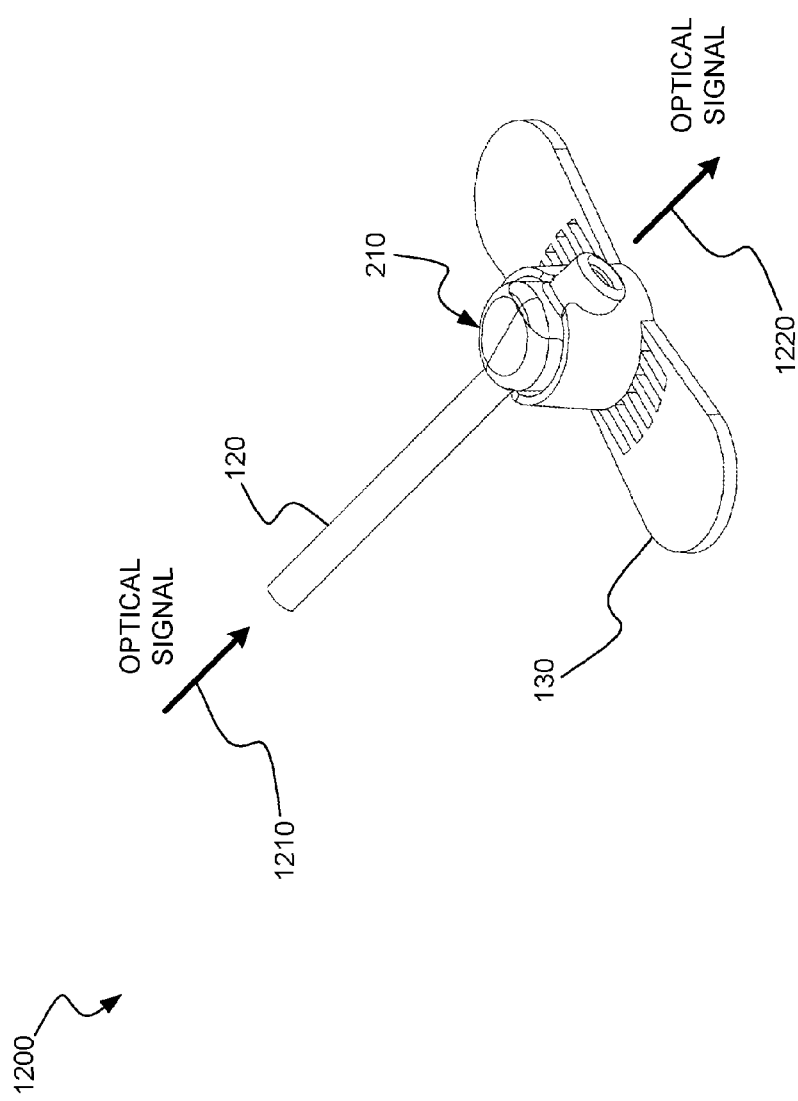
FIG. 12 is an axonometric view of an assembled transmission module with optical cable disposed in a mounting fixture of one embodiment.
Figure 12A:
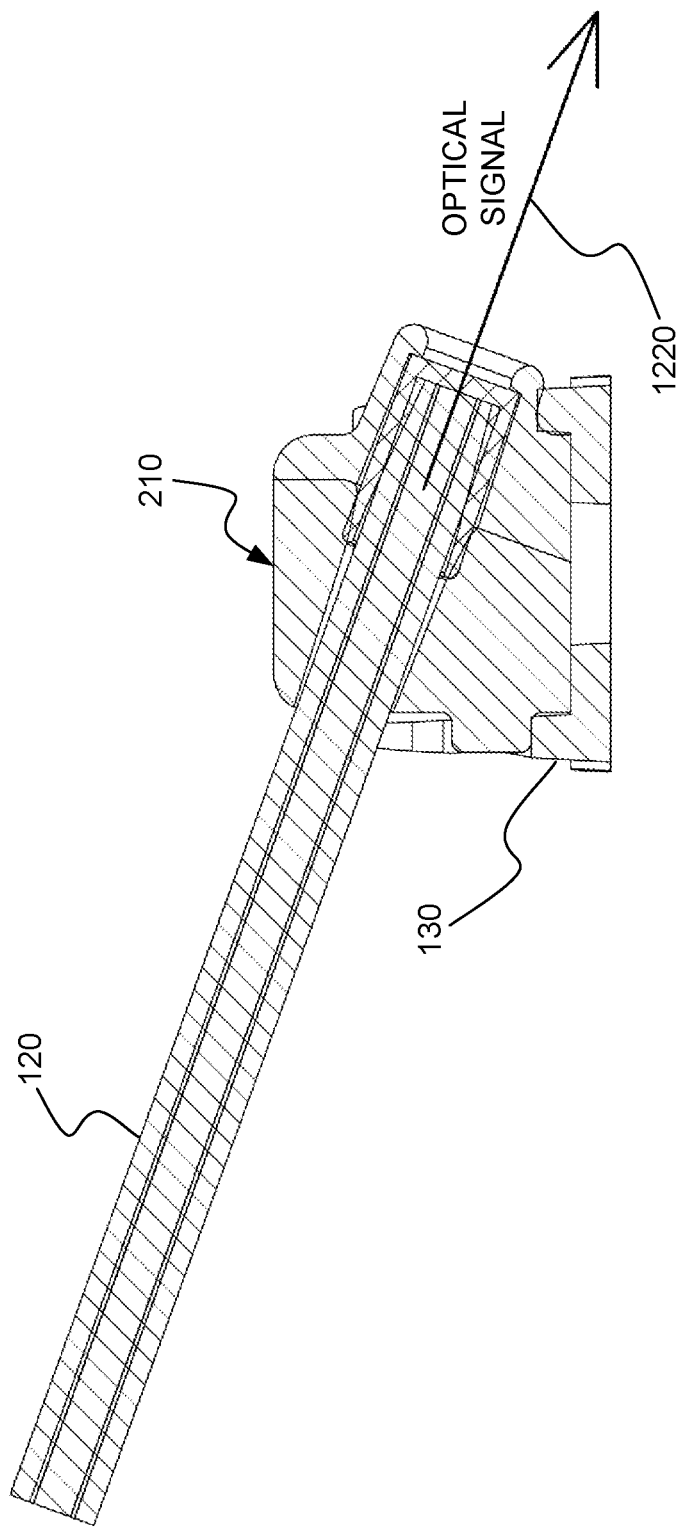
FIG. 12a is a sectional view of FIG. 12.

While bottom aperture 139 of mounting fixture 130 may be present at this end of the system, it may remain unused. Instead of mounting fixture 130 being located directly over an intended optical reception point, as it was with the originating optical transmission point, mounting fixture 130 at the transmission end may be located near the intended optical reception point. Looking now to FIG. 12, mounting fixture 130 would be located such that the optical signal (shown by arrows 1210, 1220) would be transmitted from transmission module onto a nearby optical reception point. Thus in the above example of a television reception point, mounting fixture 130 would be located near an optical reception (e.g., infrared reception) point on the television such that an optical transmission exiting transmission module 210 would be directed to the optical reception point. FIG. 12a shows a sectional view of the optical signal transmission path of FIG. 12.

Figure 13:
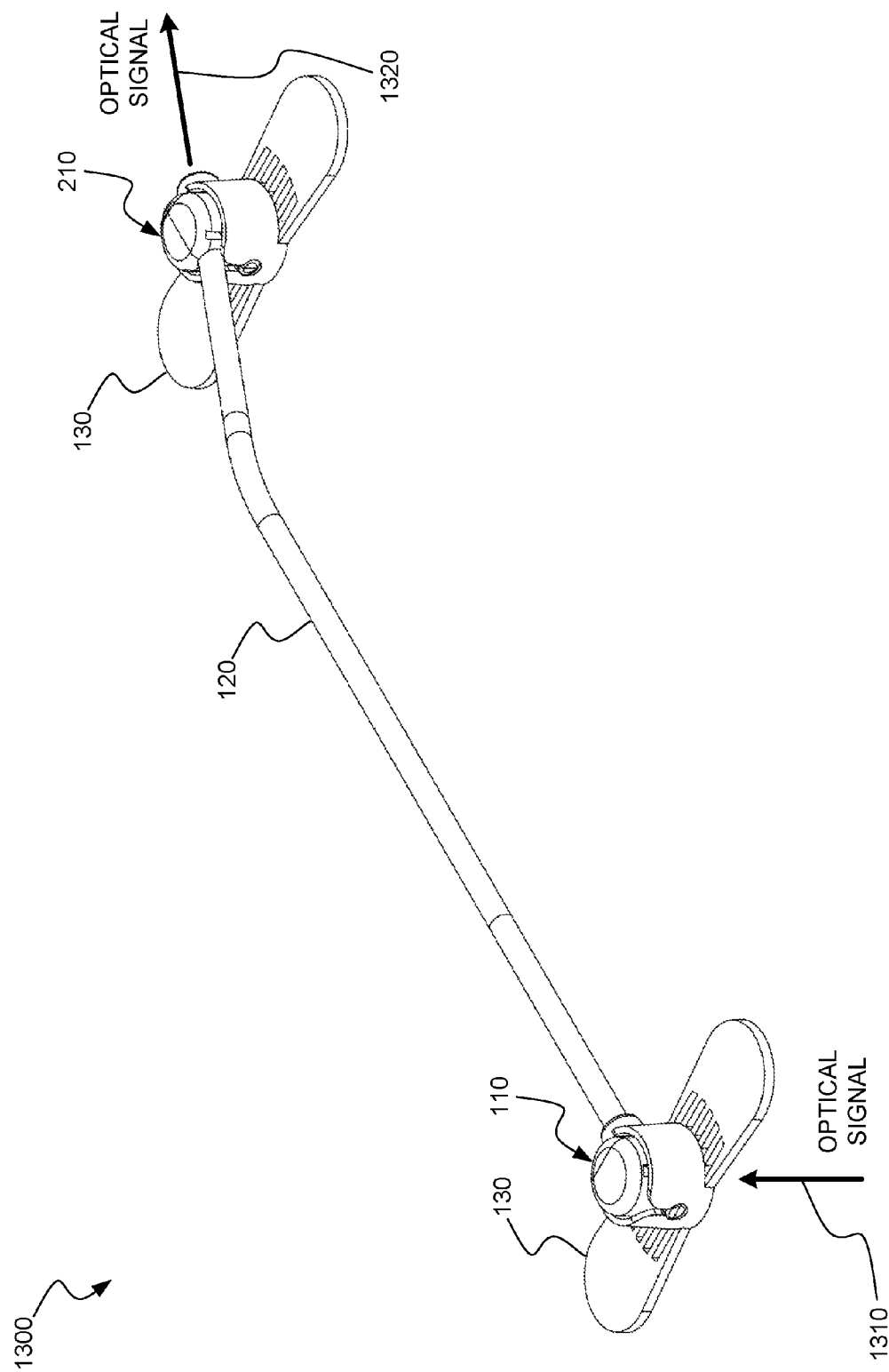
FIG. 13 is an axonometric view of a fully assembled system embodiment for transmitting signals from a first location underneath the reception module to a second location near the transmission module.

FIG. 13 shows the complete arrangement 1300 of one described embodiment having an optical signal 1310 received from an optical transmission source underneath by a reception module 110 in a first mounting fixture 130. The optical signal is then transmitted through an optical fiber in optical cable 120 to transmission module 210 in a second mounting fixture 130. The optical signal 1320 is then transmitted out of transmission module 210 toward an optical reception point. Optical cable 120 is shown shortened in FIG. 13 for the purposes of illustration only, and could be longer or shorter depending on the application. As can be seen from FIG. 13, while the optical transmission source (e.g., set top box's infrared port) would be obscured by the reception module 110 and its associated mounting fixture, the optical reception point (e.g., television's infrared port) would not be obscured by the transmission module 210.

Figure 14:
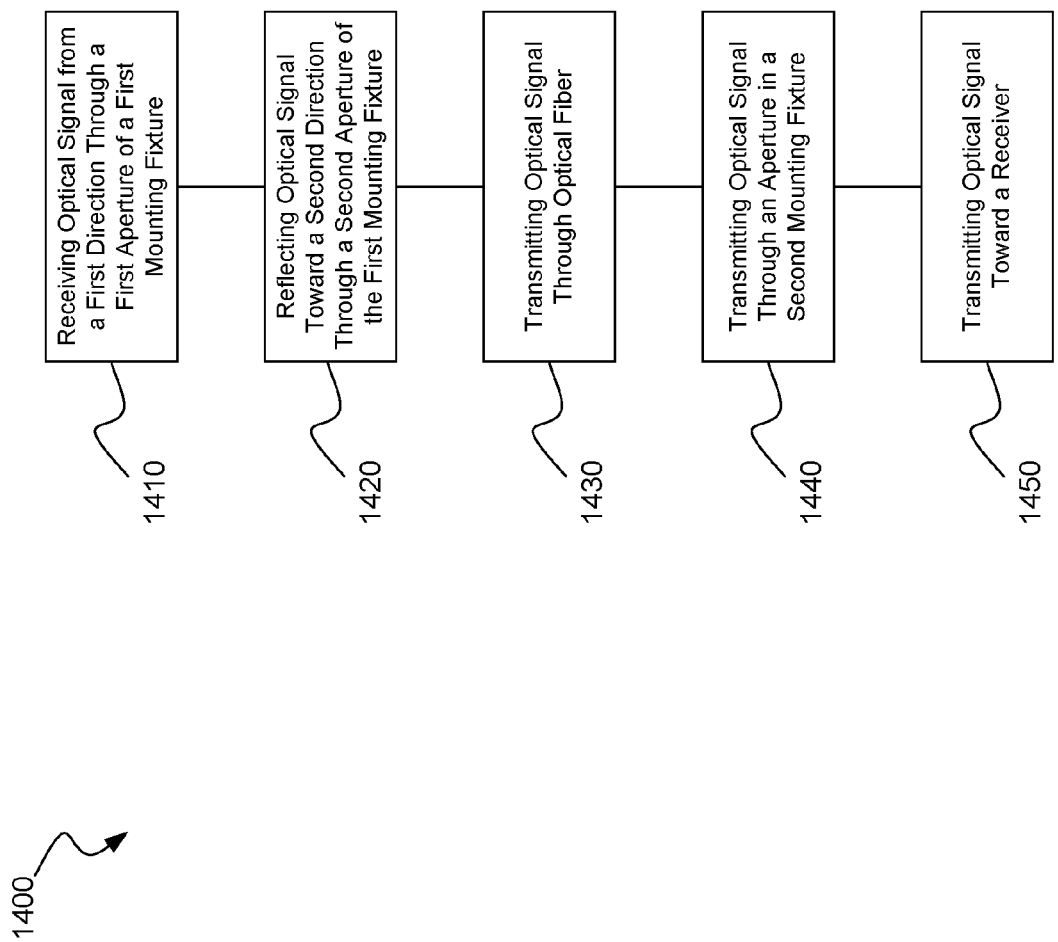
FIG. 14 is a block diagram of a method embodiment for transmitting an optical signal from a first location to a second location.

FIG. 14 is a block diagram of a method 1400 for transmitting an optical signal from a first location to a second location. Method 1400, potentially including all steps shown, fewer steps than shown, or other steps than shown, may be employed by the systems as described herein to transmit an optical signal from a first location to a second location. In other embodiments, systems not explicitly described herein may perform method 1400 or other methods performed by the various embodiments.

At block 1410, an optical signal is received from a first direction through a first aperture of a first mounting fixture. At block 1420, the optical signal is reflected toward a second direction through a second aperture of the first mounting fixture. At block 1430, the optical signal is transmitted through an optical fiber. At block 1440, the optical signal is transmitted through an aperture in a second mounting fixture. At block 1450, the optical signal is transmitted toward a receiver.

Various embodiments have now been described in detail for the purposes of clarity and understanding. However, it will be appreciated that certain changes and modifications may be practiced within the scope of the appended claims.

What is claimed is:

1. A method for transmitting an optical signal from a first location to a second location, wherein the method comprises:
   receiving the optical signal from a first direction through a first aperture at the bottom of a first cavity in a first mounting fixture;
   reflecting the optical signal in a second direction through a second aperture in the first mounting fixture;
   transmitting the optical signal through an optical fiber;
   transmitting the optical signal in a third direction through a third aperture in a second mounting fixture having a second cavity, wherein a portion of the optical fiber is disposed in the second cavity and seated within a transmission module within the second cavity; and
   transmitting the optical signal from the optical fiber toward a receiver, wherein emission of the optical signal into free space external the transmission module occurs from the portion of the optical fiber seated within the transmission module.

2. The method for transmitting an optical signal from a first location to a second location of claim 1, wherein the receiver comprises:
   a television.

3. The method for transmitting an optical signal from a first location to a second location of claim 1, wherein:
   the step of transmitting the optical signal through the optical fiber comprises the step of transmitting the optical signal in the third direction through the third aperture in the second mounting fixture.

4. The method for transmitting an optical signal from a first location to a second location of claim 1, wherein receiving the optical signal from the first direction through the first aperture at the bottom of the cavity in the first mounting fixture comprises:
   receiving the optical signal from an optical signal transmitter coupled directly beneath the first mounting fixture.

5. The method for transmitting an optical signal from a first location to a second location of claim 4, wherein the optical signal transmitter comprises
   a set top box.

6. The method of claim 1, wherein the second mounting fixture is configured to be mounted on a surface, and wherein transmitting the optical signal from the optical fiber comprises directing the optical signal at a grazing angle to the surface of 45 degrees or less.

7. The method of claim 1, wherein the first mounting fixture defines a fourth aperture proximate the first cavity, and wherein the second direction is through the fourth aperture.

8. The method of claim 1, wherein the first mounting fixture defines a fourth aperture opposite the first aperture across the first cavity.

9. The method of claim 8, wherein a protrusion is disposed within the fourth aperture.

10. The method of claim 1, wherein the transmission module includes a protrusion disposed within the third aperture.

11. The method of claim 10, wherein the third aperture is opposite the second aperture across the second cavity.

12. The method of claim 1, wherein the first mounting fixture comprises:
   a first wing extending away from one side of the first cavity;
   a second wing extending away from an opposite side of the first cavity, wherein the first wing and the second wing are coupleable to a surface.

13. The method of claim 12, wherein the first mounting fixture further comprises an adhesive on an underside of at least one of the first wing or the second wing.

14. A method for transmitting an optical signal from a first location to a second location, wherein the method comprises:
   receiving the optical signal from a first direction through a first aperture at the bottom of a cavity in a first mounting fixture having a first wing extending away from one side of the cavity and a second wing extending from an opposite side of the cavity;
   reflecting the optical signal in a second direction through a second aperture in the first mounting fixture;
   transmitting the optical signal through an optical fiber;
   transmitting the optical signal in a third direction through a third aperture in a second mounting fixture; and
   transmitting the optical signal from the optical fiber toward a receiver.

* * * * *